United States Patent [19]

Hovatter et al.

[11] Patent Number: 5,210,124
[45] Date of Patent: May 11, 1993

[54] TRI OR TETRAESTERS OF ALIPHATIC MONOCARBOXYLIC ACIDS OF 6 TO 9 CARBON ATOMS AND PENTAERYTHRITOL AS MOLD RELEASES FOR AROMATIC POLYCARBONATES

[75] Inventors: Thomas W. Hovatter, Mt. Vernon, Ind.; Christianus A. A. Claesen; Hermanus B. Savenije, both of Bergen Op Zoom, Netherlands

[73] Assignee: General Electric Company, Pittsfield, Mass.

[21] Appl. No.: 734,081

[22] Filed: Jul. 22, 1991

Related U.S. Application Data

[63] Continuation of Ser. No. 458,474, Dec. 28, 1989, abandoned.

[51] Int. Cl.[5] .................. C08K 5/10; C08L 91/00
[52] U.S. Cl. .................... 524/311; 524/312; 524/313; 524/314; 524/315; 524/317

[58] Field of Search ............... 524/284, 310, 311, 312, 524/313, 315, 317, 318

[56] References Cited

U.S. PATENT DOCUMENTS

| | | | |
|---|---|---|---|
| 2,356,745 | 8/1944 | Barth et al. | 524/310 |
| 3,836,499 | 9/1974 | Schirmer et al. | 524/318 |
| 4,065,436 | 12/1977 | Adelman et al. | 528/486 |
| 4,131,575 | 12/1978 | Adelman et al. | 524/311 |
| 4,143,024 | 3/1979 | Adelman et al. | 524/310 |
| 4,487,874 | 12/1984 | Lindner | 524/311 |
| 4,670,479 | 6/1987 | Miyauchi | 524/318 |
| 4,743,641 | 5/1988 | Shizawa et al. | 524/317 |
| 4,762,873 | 8/1988 | Miyauchi et al. | 524/317 |
| 5,055,508 | 10/1991 | Ohtsubo | 524/310 |

Primary Examiner—Paul R. Michl
Assistant Examiner—Peter Szekely

[57] ABSTRACT

A composition comprising an aromatic polycarbonate in admixture with a mold release effective amount of an ester of an aliphatic carboxylic acid of 6 to about 9 carbon atoms and a trihydric or tetrahydric alcohol.

3 Claims, No Drawings

TRI OR TETRAESTERS OF ALIPHATIC MONOCARBOXYLIC ACIDS OF 6 TO 9 CARBON ATOMS AND PENTAERYTHRITOL AS MOLD RELEASES FOR AROMATIC POLYCARBONATES

This is a continuation of copending application Ser. No. 07/458,474, filed Dec. 28, 1989, now abandoned.

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner, the mold resident cycle time should be kept to a minimum. This shorter cycle time provides a shorter resin heat period with consequently less thermal damage to the resin itself and/or less thermally promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Additionally, it is also helpful to provide plasticization if at all possible. By plasticization is meant better melt flow of the thermoplastic resin. This plasticization should be preferably achieved without any significant lowering of any of the physical properties of the resin. With respect to polycarbonates, examples of the physical properties which should be substantially unchanged are light transmission, impact resistance, delamination and toughness of the material.

Esters prepared from monocarboxylic acids and multihydric alcohols have long been known as mold release agents for polycarbonate. For example U.S. Pat. No. 3,784,595 discloses the use of esters of trihydric alcohols and aliphatic carboxylic acids with 10 carbon atoms or more at levels of 0.1 to 2 wt. % of polycarbonate. DE2729485 discloses the use of esters of tetrahydric alcohols and carboxylic acids with 6 carbon atoms or more for mold release of polycarbonate at levels of 0.1 to 3 wt. %.

Aliphatic acid esters as plasticisers for polycarbonate have been disclosed in U.S. Pat. No. 3,186,961. Only esters having up to 22 carbon atoms and derived from $C_2$ to $C_{18}$ aliphatic carboxylic acids and $C_1$ to $C_6$ monohydric alcohols are disclosed. The only working examples of the esters disclosed in the patent are directed to aromatic esters. Furthermore a very special process for compounding these materials in sufficiently high concentrations is suggested. In the DE2729485, and U.S. Pat. No. 3,784,595, the major examples utilizing the multihydric alcohols were with the ester prepared from stearic acid. In the DE patent, the highest weight percentage of ester actually employed in the examples was 0.3 wt.%.

It has now been discovered that the usage of lower carbon atom aliphatic acid esters than employed previously brings about substantially better mold release for polycarbonate than the stearic acid esters of tri and tetrahydric alcohols, particularly pentaerythrityltetrastearate. This particular tetrastearate has been used commercially as a mold release agent for polycarbonte since 1977. Furthermore, at higher levels of the invention ester, very good plasticization of the polycarbonate occurs without significant deterioration of physical properties.

SUMMARY OF THE INVENTION

In accordance with the invention there is a composition comprising aromatic polycarbonate and from about 0.2 to less than 10 weight % of an ester of an aliphatic carboxylic acid with 6 to 9 carbon atoms and an aliphatic tri or tetrahydric alcohol.

DETAILED DESCRIPTION OF THE INVENTION

The aromatic polycarbonates useful in the invention are the usual aromatic polycarbonates well known in the literature for many years. The aromatic polycarbonates are prepared from the reaction of a dihydric phenol and a carbonate precursor. The dihydric phenols useful in preparing the aromatic polycarbonates include those of the formula.

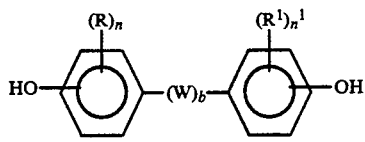

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

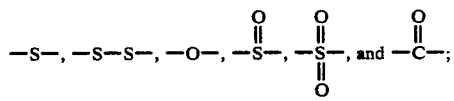

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —OR² wherein R² is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4 -dihydroxydiphenyl ether;
4,4 -thiodiphenol;
4,4 -dihydroxy-3,3 -dichlorodiphenyl ether; and
4,4 -dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, diphenyl carbonate and the like. When using an interfacial process or a bischloroformate process it is also preferred to use a standard catalyst system well known in the synthesis of polycarbonates and copolyestercarbonates. A typical catalyst system is that of an amine system such as tertiaryamine, amidine or guanidine. Tertiaryamines are generally employed in such reactions. Trialkylamines such as triethylamine are generally preferred.

Esters which are effective in accordance with the invention are the reaction products of trihydric alcohols or tetrahydric alcohols with aliphatic carboxylic acids of which the carbon number is 6 to about 9 carbon atoms. Examples of trihydric alcohols include glycerol, trimethylolpropane, hexanetriol and the like. Generally, trihydric alcohols which can be employed are from 3 to about 16 carbon atoms, preferrably 3 to about 8 carbon atoms. Examples of tetrahydric alcohols include various alcohols preferably having between 4 and 16 carbon atoms, more preferably between 4 and 8 carbon atoms. Examples of tetrahydric alcohols include erythritol, mesoerythritol and pentaerythritol. The aliphatic carboxylic acids from 6 to 9 carbon atoms are illustratively exemplified by caproic acid, caprylic acid, and pelargonic acid and the like. These acids can be optionally used together with polycarboxylic aliphatic acids for example those with 6 to 9 carbon atoms. Examples of the polycarboxylic acids include suberic, azelaic, adipic and pimelic.

Illustrative examples of esters to be used according to the invention are pentaerythritoltetrapelargonate, trimethylolpropanetripelargonate, glyceroltricaprylate, pentaerythritoltetracaprylate, trimethylopropyltriadipate and the like.

The carboxylic acid esters to be used according to the invention are prepared according to customary processes, for example, in accordance with the Einhorn process using pyridine as the acid-binding agent, from alcohol and acid chloride in an inert solvent, or in the melt from the alochol and acid with or without esterification catalysts such as, for example, p-toluenesulphonic acid. The esterification is carried out at 200°-250° C. Such processes are described, for example, in "Houben-Weyl, Methoden der organischen Chemie (Methods of Organic Chemistry)," Georg Thieme Verlag, Stuttgart, 1952, 4th Edition, Volume VIII, page 516 et. seq.

The quantity of the ester to be used in the aromatic polycarbonate is a mold release effective amount. Generally this is from about 0.2 to less than about 10% of the ester as measured on the basis of the polycarbonate. Preferred quantities are from about 0.5 to about 9 wt. % of the ester. Generally in the range of from about 0.2 to about 3 wt. % of the ester, there is signifcant mold release activity. However the plasticizing effect as measured by melt viscosity determination is not particularly great. Above about 3.0 wt. % preferably 3.5 to about 4 wt. %, the plastiticization activity of the esters is very significant and is a desired property additional to the already present mold release capabilities. Surprisingly, as the weight percent ester increases, the composition physical properties such as light transmission, impact resistance and delamination are largely unaffected. However the processability of the material as measured by its melt viscosity, for example, melt volume index (CC/10') increases very substantially. It is interesting to note that the standard mold release agent, pentaerythrityltetrastearate (PETS) brings about significant delamination and reduction in light transmission when the PETS is utilized at higher weight percentages such as 5%.

The incorporation of the carboxylic acid esters into the high molecular weight, thermoplastic polycarbonates is effected, by standard techniques for example, by adding the substances, which are normally in the form of a powder, onto the granules of the polycarbonate by tumbling and subsequently extruding the material on a twin-screw extruder at 280° C. to form a ribbon, which is then granulated. Mixing in a Brabender blender is also effective. However, the mold release agent can also be incorporated during manufacture of the solid polycarbonate. In that case the ester is either admixed, as a solution in a solvent, with the polycarbonate solution before reaching a devolatilization screw, or is metered, without solvent, into the polycarbonate melt.

Below are examples of the invention. All of these examples utilize a bisphenol-A polycarbonte.

All polycarbonate compounds were dry blended in a Papenmeijer blender (all additives added at once) and subsequently extruded at a melt temperature of 290°-300° C. (settings 240°-290° C.) on a Leistritz single screw extruder. Materials were then injection molded at 280° C. melt/80° C. mold temperature.

Melt volume indices were determined with a Zwick type 4105.01.

Delamination was judged from visual inspection of an izod bar failure surface, as well as by making incisions in molded discs and subsequently trying to peel off the skin. N is none. Y is yes.

Release performance was checked by injection molding a 20×30 cm fuse box lid on a Battenfeld injection molding machine. Easy release (part comes off immediately as the ejector pins push)= + +, part comes off, but with some noise= +, part does not readily come off, and deforms severely= − −.

TABLE 1

|  | 1 | 2 | 3 | 4 | 5 | 6 | 7 | 8 | 9 |
|---|---|---|---|---|---|---|---|---|---|
| POLYCARBONATE: | PC[1] | PC2 | PC2 | PC2 | PC2 | PC2 | PC2 | PC2 | PC2 |
| PETP* | — | — | 0.5 | 5 | 8 | 10 | — | — | — |
| PETS** | — | — | — | — | — | — | 0.5 | 5 | — |
| PETB*** | — | — | — | — | — | — | — | — | 10 |
| Melt volume index (cc/10')1 | 8.6 | 3 | 3.3 | 7.1 | 11.4 | 15.3 | 3.1 | 6.3 | 13.2 |
| Transmission of light, % | 90 | 89 | 88 | 89 | 89 | 70 | 89 | 0 | 88 |
| Falling dart impact, J | 56 | 131 | 135 | 132 | 138 | 106 | 130 | 115 | 99 |
| Delamination | N | N | N | N | N | N | N | Y | N |
| Release Performance | — — | — — | ++ | ++ | ++ | ++ | + | ++ | — |

PC[1] has an IV of 42.5 ml/g; PC2 of 49 ml/g
*Pentaerythritol tetrapelargonate (C9 acid)
**Pentaerythritol tetrastearate (C18 acid)
***Pentaerythritol tetrabenzoate, a known PC plasticiser of aromatic character; no release performance.

As is readily shown in the previous Table, PETP is an excellent mold release agent even at the low quantities of 0.5 wt. %. At this low quantity there is some improvement in melt viscosity shown. At 5 wt.%, PETP remains an excellent mold release agent. However, additionally the composition melt viscosity has diminished substantially while still maintaining the light transmission, impact resistance and lack of delamination. At 8 and 10% the positive attributes of PETP are still present in the composition. The melt viscosity has decreased still further thereby providing a substantially more readily processible resin.

Contrasted to the PETP are the PETS results. At the lower weight percentage, 0.5 wt. %, the release performance is not as good as the release performance of PET at the same weight percent. At 5 wt. %, the PETS performance as a mold release agent is now equivalent to that of PETP, however all of the light transmission of the polycarbonate composition is gone and the composition is now subject to delamination. The PETB material at 10 weight % shows good plasticization but no melt release properties.

These data show the surprising and significant superiority of the mold release agents of the invention over the structually related commercial mold release agent presently employed.

What is claimed is:

1. A composition comprising an aromatic polycarbonate in admixture with a mold release effective amount from about 0.2 to less than about 10 weight percent of the aromatic polycarbonate of a tetraester of an aliphatic monocarboxylic acid of 6 to 9 carbon atoms and pentaerythritol.

2. The composition in accordance with claim 1 wherein the acid is pelargonic acid and the ester is pentaerythritoltetrapelargonate.

3. The composition in accordance with claim 1 wherein the polycarbonate is bisphenol-A polycarbonate.

* * * * *